(12) United States Patent
Sathyanarayanamurthy et al.

(10) Patent No.: US 11,914,981 B2
(45) Date of Patent: *Feb. 27, 2024

(54) SYSTEM AND METHOD FOR PRODUCTION READINESS VERIFICATION AND MONITORING

(71) Applicant: Walmart Apollo, LLC, Bentonville, AR (US)

(72) Inventors: Vijitha Sathyanarayanamurthy, San Jose, CA (US); Vilas Veeraraghavan, Newark, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,053

(22) Filed: Jul. 18, 2022

(65) Prior Publication Data

US 2022/0350583 A1 Nov. 3, 2022

Related U.S. Application Data

(63) Continuation of application No. 16/246,305, filed on Jan. 11, 2019, now Pat. No. 11,422,784.

(51) Int. Cl.
*G06F 9/44* (2018.01)
*G06F 8/61* (2018.01)
(Continued)

(52) U.S. Cl.
CPC ............ *G06F 8/61* (2013.01); *H04L 41/5083* (2013.01); *H04L 41/5096* (2013.01); *H04L 67/34* (2013.01); *H04L 67/75* (2022.05)

(58) Field of Classification Search
CPC ... G06F 8/61; H04L 41/5083; H04L 41/5096; H04L 67/34; H04L 67/75
(Continued)

(56) References Cited

U.S. PATENT DOCUMENTS 8,279,067 B2 * 10/2012 Berger ............... G06Q 10/0833
340/572.8
8,612,599 B2 12/2013 Tung et al.
(Continued)

OTHER PUBLICATIONS

Alhamazani et al., "An overview of the commercial cloud monitoring tools: research dimensions, design issues, and state-of-the-art", 2015, Springer, pp. 357-377. (Year: 2015).*
(Continued)

*Primary Examiner* — Ted T. Vo
(74) *Attorney, Agent, or Firm* — Morgan, Lewis & Bockius LLP; Manita Rawat (57) ABSTRACT

Systems and methods for production readiness verification and monitoring are disclosed. A set of compliance requirements including one or more cloud-specific requirements and status information regarding a status of each of a plurality of clouds within a cloud environment is received. The status information includes availability of one or more servers within each of the plurality of clouds. The status information for each of the plurality of clouds is compared to the one or more cloud-specific requirements and the cloud environment as identified as one of compliant or non-compliant. The cloud environment is identified as compliant when each of the one or more cloud-specific requirements are satisfied and non-compliant when at least one of the one or more cloud-specific requirements are not satisfied.

20 Claims, 6 Drawing Sheets

(51) Int. Cl.
*H04L 41/50* (2022.01)
*H04L 67/00* (2022.01)
*H04L 67/75* (2022.01)

(58) Field of Classification Search
USPC .................................. 717/101–103, 168–178
See application file for complete search history.

(56) References Cited

U.S. PATENT DOCUMENTS

| | | | |
|---|---|---|---|
| 8,645,529 | B2 | 2/2014 | Doddavula |
| 8,706,869 | B2 | 4/2014 | Campion et al. |
| 9,158,590 | B2 | 10/2015 | Boss et al. |
| 9,483,258 | B1 | 11/2016 | Labat et al. |
| 9,888,040 | B2 | 2/2018 | Hoy et al. |
| 10,103,937 | B1 | 10/2018 | Thompson et al. |
| 10,411,975 | B2 | 9/2019 | Martinez et al. |
| 10,664,792 | B2 * | 5/2020 | Berger ............... G06Q 10/0833 |
| 10,719,332 | B1 | 7/2020 | Dwivedi et al. |
| 10,754,638 | B1 | 8/2020 | Dwivedi et al. |
| 11,093,227 | B1 | 8/2021 | Shteyman et al. |
| 11,182,139 | B2 * | 11/2021 | Sathyanarayanamurthy ............... G06F 8/61 |
| 11,422,784 | B2 * | 8/2022 | Sathyanarayanamurthy ............... H04L 41/5096 |
| 2006/0200818 | A1 | 9/2006 | Oprea et al. |
| 2012/0089726 | A1 | 4/2012 | Doddavula |
| 2012/0324070 | A1 | 12/2012 | Campion et al. |
| 2013/0031551 | A1 | 1/2013 | Agarwal et al. |
| 2013/0042004 | A1 | 2/2013 | Boss et al. |
| 2013/0060933 | A1 | 3/2013 | Tung et al. |
| 2013/0179876 | A1 | 7/2013 | Aliminati et al. |
| 2013/0219156 | A1 | 8/2013 | Sears |
| 2014/0280961 | A1 | 9/2014 | Martinez et al. |
| 2014/0373011 | A1 | 12/2014 | Anderson et al. |
| 2016/0036667 | A1 | 2/2016 | Kripalani et al. |
| 2017/0013021 | A1 | 1/2017 | Hoy et al. |
| 2017/0024396 | A1 | 1/2017 | Adarsh et al. |
| 2018/0060226 | A1 | 3/2018 | Siggers et al. |
| 2018/0191599 | A1 | 7/2018 | Balasubramanian et al. |
| 2018/0351876 | A1 | 12/2018 | Ren |
| 2020/0225924 | A1 | 7/2020 | Sathyanarayanamurthy et al. |

OTHER PUBLICATIONS

Xu et al., "A Novel Multipath-Transmission Supported Software Defined Wireless Network Architecture", 2017, IEEE, pp. 2111-2125. (Year: 2017).*

Stephanow et al., "Evaluating the performance of continuous test-based cloud service certification", 2017 17th IEEE/ ACM International Symposium on Cluster, Cloud and Grid Computing, 2017, p. 1117-1126.

Fischer et al., "Towards an Approach for Automatically Checking Compliance Rules in Deployment Models", Institute of Architecture of Application Systems, University of Stuttgart, Germany, 2017, pp. 1-5.

* cited by examiner

SYSTEM AND METHOD FOR PRODUCTION READINESS VERIFICATION AND MONITORING

CROSS-REFERENCE TO RELATED APPLICATIONS

This application is a continuation of, and claims priority to, U.S. patent application Ser. No. 16/246,305, filed on Jan. 11, 2019 and entitled "SYSTEM AND METHOD FOR PRODUCTION READINESS VERIFICATION AND MONITORING," and which is hereby incorporated by reference in its entirety.

TECHNICAL FIELD

This application relates generally to cloud monitoring and, more particularly, to application monitoring in a hybrid cloud environment.

BACKGROUND

Prior to deployment of an application, a developer must verify and authenticate that the cloud environment is capable of supporting the application. For example, developers must verify the health of the cloud environment, individual clouds with the cloud environment, individual servers within the clouds, and individual instances of supporting applications and services within each server. Such verification is tedious and requires a developer to be knowledgeable about the cloud environments requirements for application deployment.

Such issues are enhanced in hybrid cloud environments (e.g., cloud environments including both public clouds and private clouds). The deployment requirements, structures, permissions, best practices, etc. may be different for public clouds and private clouds and/or amongst public clouds and/or private clouds. A developer that wishes to deploy an application to a hybrid environment must spend time learning the requirements at each cloud management layer (e.g., environment layer, individual cloud layer, individual server layer, etc.) and ensure compliance within each cloud at each cloud management layer. Such verification is time consuming and error prone.

SUMMARY

In various embodiments a system including a computing device is disclosed. The computing device is configured to receive a set of compliance requirements including one or more cloud-specific requirements and status information regarding a status of each of a plurality of clouds within a cloud environment. The status information includes availability of one or more servers within each of the plurality of clouds. The computing device compares the status information for each of the plurality of clouds to the one or more cloud-specific requirements and identifies the cloud environment as one of compliant or non-compliant. The cloud environment is identified as compliant when each of the one or more cloud-specific requirements are satisfied and non-compliant when at least one of the one or more cloud-specific requirements are not satisfied.

In various embodiments a non-transitory computer readable medium having instructions stored thereon is disclosed. The instructions, when executed by a processor cause a device to perform operations including receiving a set of compliance requirements including one or more cloud-specific requirements and status information regarding a status of each of a plurality of clouds within a cloud environment. The status information includes availability of one or more servers within each of the plurality of clouds. The instructions further cause the process to compare the status information for each of the plurality of clouds to the one or more cloud-specific requirements and identify the cloud environment as one of compliant or non-compliant. The cloud environment is identified as compliant when each of the one or more cloud-specific requirements are satisfied and non-compliant when at least one of the one or more cloud-specific requirements are not satisfied.

In various embodiments a method is disclosed. The method includes a step of receiving a set of compliance requirements including one or more cloud-specific requirements and status information regarding a status of each of a plurality of clouds within a cloud environment. The status information includes availability of one or more servers within each of the plurality of clouds. The method further includes a step of comparing the status information for each of the plurality of clouds to the one or more cloud-specific requirements and identifying the cloud environment as one of compliant or non-compliant. The cloud environment is identified as compliant when each of the one or more cloud-specific requirements are satisfied and non-compliant when at least one of the one or more cloud-specific requirements are not satisfied.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In various embodiments, a set of compliance requirements including one or more cloud-specific requirements and status information regarding a status of each of a plurality of clouds within a cloud environment is received. The status information includes availability of one or more servers within each of the plurality of clouds. The status information for each of the plurality of clouds is compared to the one or more cloud-specific requirements and the cloud environment is identified as either compliant or non-compliant. The cloud environment is identified as compliant when each of the one or more cloud-specific requirements are satisfied and non-compliant when at least one of the one or more cloud-specific requirements are not satisfied.

Figure 1:
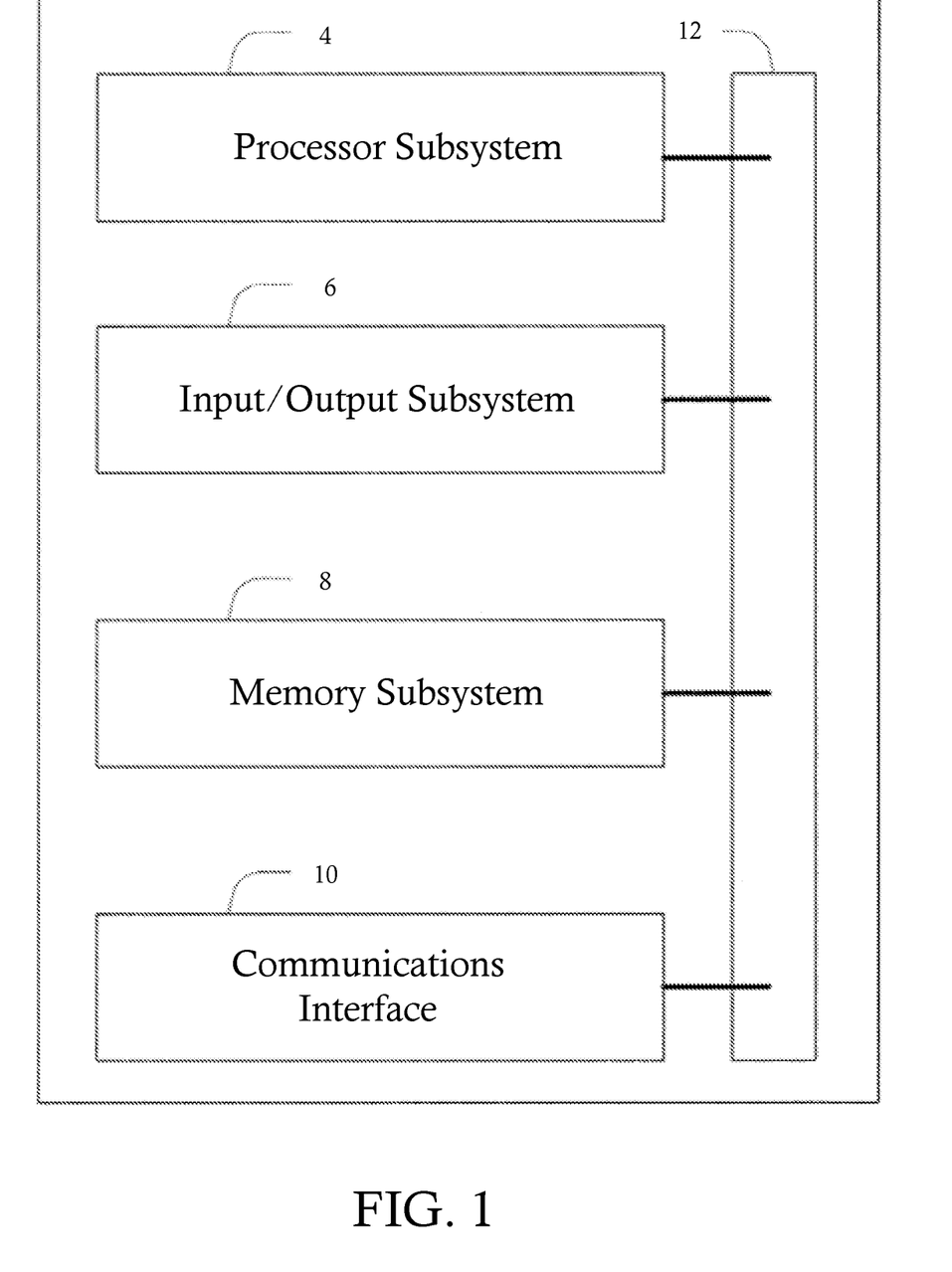
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
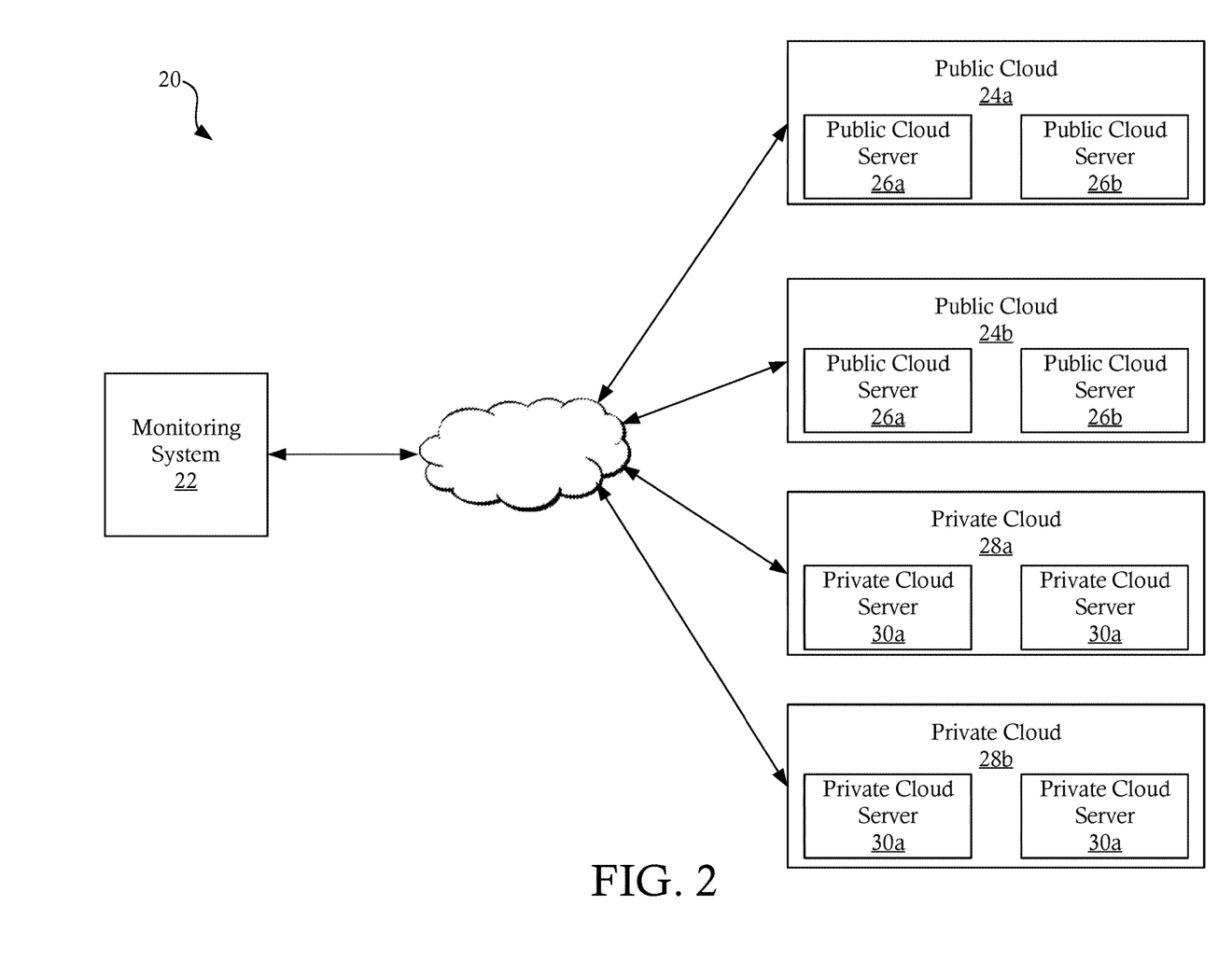
FIG. 2 illustrates a network configured to provide cloud deployment and monitoring of cloud-based applications, in accordance with some embodiments.

FIG. 2 illustrates a network 20 configured to provide cloud deployment and monitoring of cloud-based applications, in accordance with some embodiments. In some embodiments, the network 20 includes at least one monitoring system 22 in signal communication with a plurality of public clouds 24a, 24b (collectively public clouds 24) each including a plurality of public cloud servers 26a, 26b (collectively public cloud servers 26) and a plurality of private clouds 28a. 28b (collectively private clouds 28) each including a plurality of a private cloud servers 30a, 30b (collectively private cloud servers 30). Each of the systems 22, 26a, 26b, 30a, 30b can include a system 2 as described above with respect to FIG. 1, and similar description is not repeated herein. Although the systems are each illustrated as independent systems, it will be appreciated that each of the systems may be combined, separated, and/or integrated into one or more additional systems. For example, in some embodiments, the monitoring system 22 and at least one of the private cloud servers 30 may be implemented by a shared server or shared network system. Similarly, the public cloud servers 26 may be integrated, such as in a single networked system or server.

The monitoring system 22 is configured to monitor each of the public clouds 24 and the private clouds 28 to monitor, review, and correct compliance of the clouds 24, 28 with one or more application requirements, cloud requirements, and/or network requirements for deployment of one or more network applications. In some embodiments, the monitoring system 22 is configured to monitor the availability of one or more services, the distribution of one or more applications, the availability and/or health of one or more servers, and/or any other suitable metrics for determining compliance of an application deployment with one or more deployment requirements.

In various embodiments, each of the clouds 24, 28 include a plurality of cloud servers 26, 30 configured to implement one or more applications, services, and/or other functions. For example, each of the cloud servers 26, 30 can be configured to implement a plurality of applications and associated services. Each deployment of an application, service, and/or cloud 24, 28 may include one or more requirements (or rules) for meeting quality control or uptime requirements, such as, for example, high availability requirements, disaster recovery requirements, and/or other quality control or uptime requirements. Each of the requirements may apply to an individual server 26, 30, clouds 24, 28, and/or the entire networked environment 20. For example, in some embodiments, private clouds may include requirements that each application be deployed to at least two data centers with each data center including at least two servers each running at least one instance of an application to satisfy high availability requirements. As another example, in some embodiments, public clouds may include requirements that each application be deployed to at least two cloud regions with at least three instances in each region to satisfy high availability requirements. It will be appreciated that any suitable rules can be applied for any suitable quality control, uptime, or other requirements.

Figure 3:
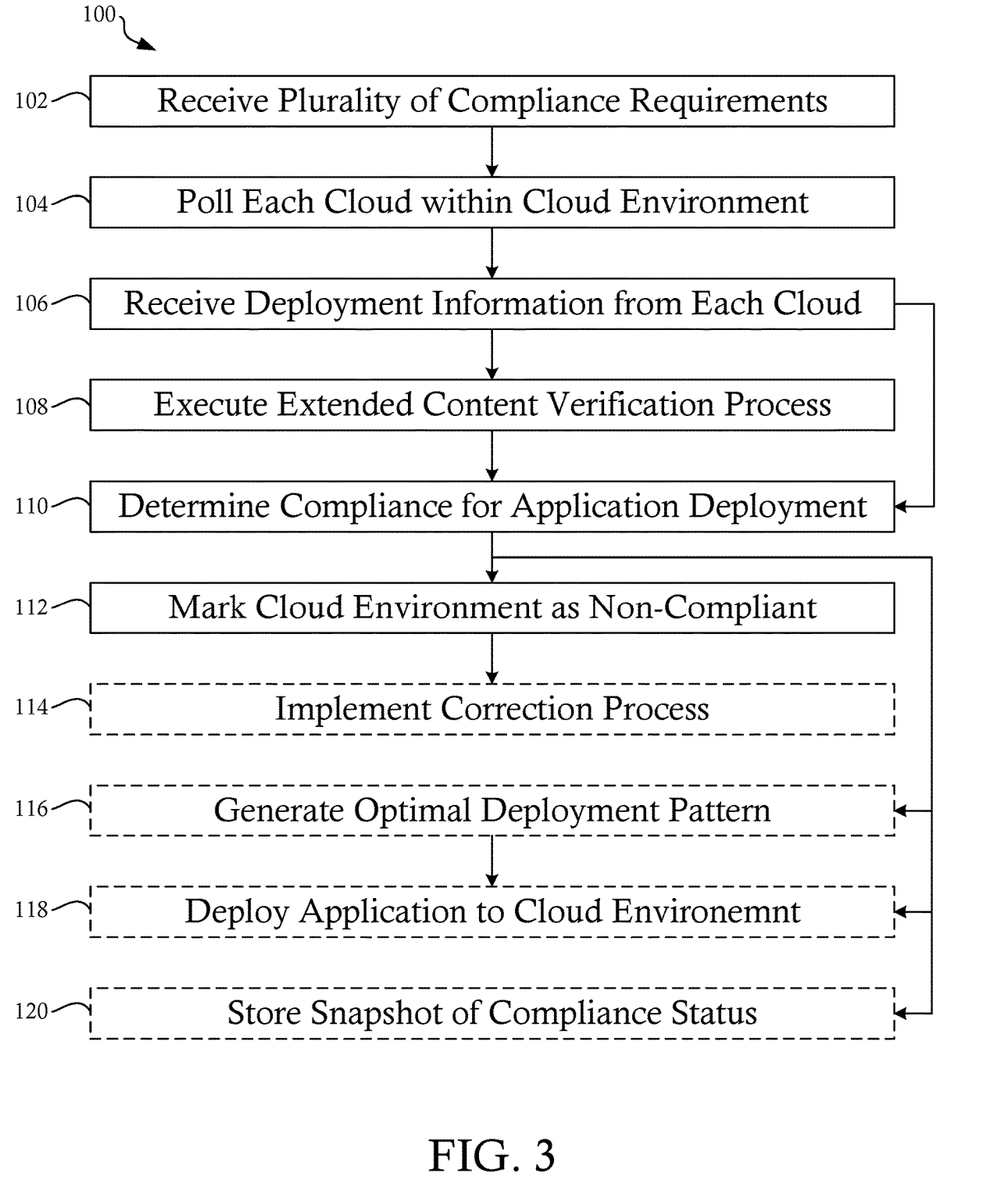
FIG. 3 is a flowchart illustrating a method of verifying high availability and disaster recovery compliance, in accordance with some embodiments.
Figure 4:
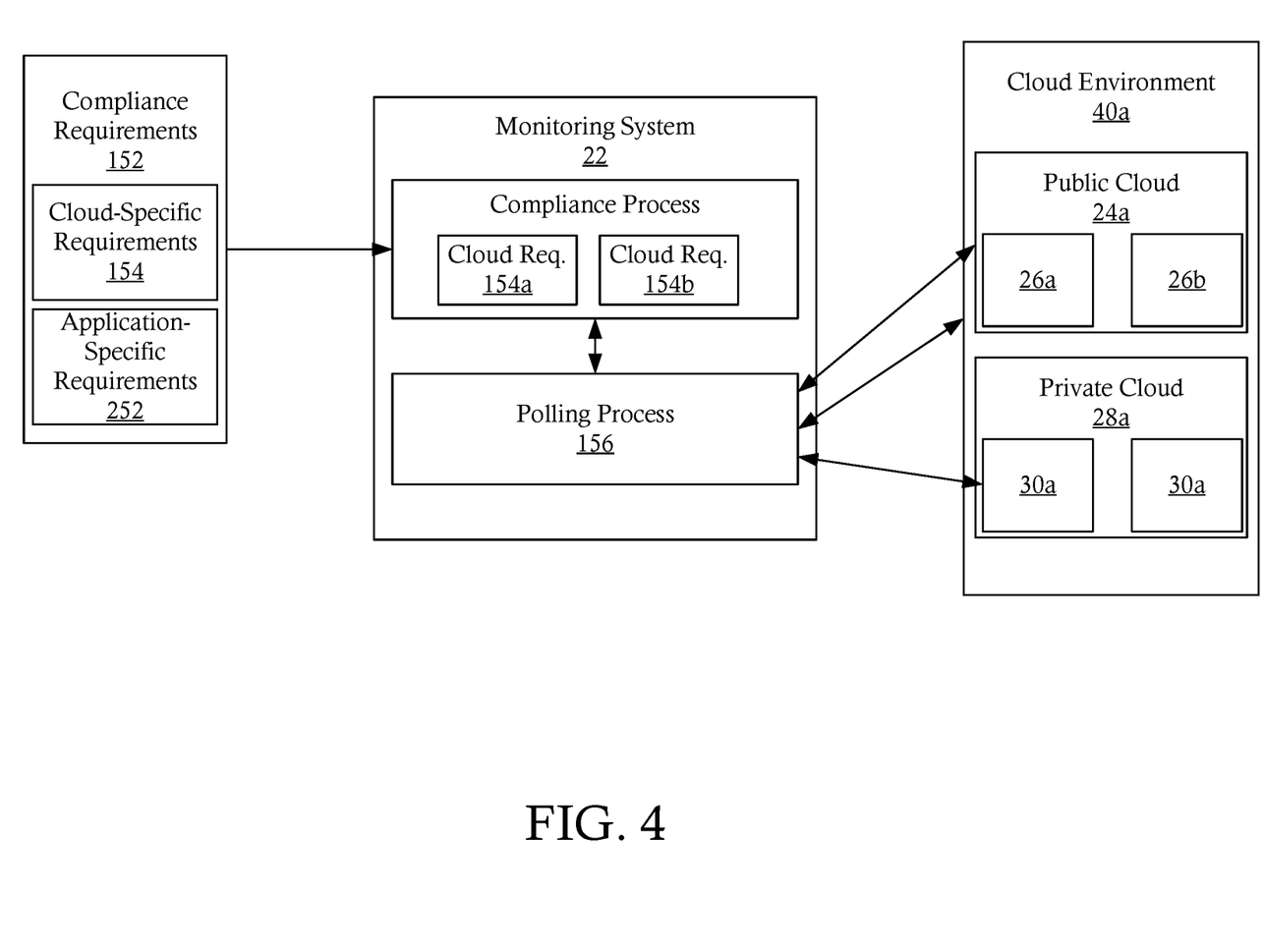
FIG. 4 illustrates various system elements during executing of the method of verifying high availability and disaster recovery compliance illustrated in FIG. 3, in accordance with some embodiments.

FIG. 3 is a flowchart illustrating a method 100 of monitoring and correcting cloud compliance requirements, in accordance with some embodiments. FIG. 4 illustrates various system components during execution of the method 100, in accordance with some embodiments. At step 102, a plurality of compliance requirements 152 are received. The compliance requirements 152 can include any suitable requirements, such as, for example, cloud-specific compliance requirements 154 (e.g., high availability requirements, disaster recovery requirements, etc.), application-specific compliance requirements 252, and/or any other compliance requirements. In some embodiments, the cloud-specific compliance requirements may specify a minimum requirements for general deployment of applications to the cloud environment 40a, such as, for example, a minimum number of data centers, a minimum number of servers, a minimum number of regions, a minimum number of application instances, a minimum uptime requirement for servers and/or clouds, and/or any other suitable compliance requirements. Similarly, in some embodiments, the application-specific compliance requirements 252 may specify minimum application/service requirements for deployment a specific application, such as, for example, availability of support or required applications/services within the cloud environment 40a.

In some embodiments, the cloud-specific requirements 154 for one or more private clouds are different than the compliance requirements for one or more public clouds. For example, in some embodiments, the cloud-specific requirements 154 for a private cloud may include requirements that any application or service be deployed to at least two data centers of the private cloud and be deployed to at least two servers or systems within each data center with at least one deployment per server. In contrast, cloud-specific requirements 154 for a public cloud may include requirements that any applications or services be deployed to at least three geographically diverse regions and include at least two deployments within each region. Although specific examples of cloud-specific requirements 154 are discussed herein, it will be appreciated that any suitable cloud-specific requirements 154 can be received.

In some embodiments, the application-specific compliance requirements 252 are associated with a specific application, service, and/or set of applications and services that have been previously deployed and/or are configured to be deployed to the cloud environment 40a ("target application"). For example, in some embodiments, the application-specific compliance requirements 252 may include requirements for additional deployments or instances to satisfy application-specific high availability and/or disaster recovery requirements. In some embodiments, the application-specific compliance requirements 252 identify a plurality of support applications/services that are required for deployment of the target application.

At step 104, each cloud 24a, 28a within the cloud environment 40a is polled or otherwise reviewed to obtain the current status of the cloud 24a, 24b. For example, in some embodiments, a cloud monitoring system 22 is configured to execute a polling process 156 to request information regarding the status of each public cloud 24a and/or private cloud 28a monitored by the monitoring system 22. The requested information can include, but is not limited to, the status (e.g., availability) of each cloud 24a, 28a and/or server 26, 30 within each cloud 24a, 28a, current software, applications, services, or builds deployed to each cloud 24a, 28a or server 26, 30, the location of each cloud 24a, 28a and/or server 26, 30, the uptime/reliability of each cloud 24a, 28a and/or server 26, 30, and/or any other suitable health or availability information. Each cloud 24a, 28a may provide deployment information 156a, 156b to the monitoring system 22 in response to the polling request.

At step 106, the status information received from each respective cloud 24a, 28a is compared to the compliance requirements 152 to determine whether the cloud environment 40a satisfies the compliance requirements 152. For example, the monitoring system 22 may determine whether each individual cloud 24a, 28a satisfies cloud-specific compliance requirements 154. In some embodiments, and as discussed above, in some embodiments the cloud-specific compliance requirements 154 for a public cloud 24a and a private cloud 28a may be different. The monitoring system 22 is configured to review status information from each cloud 24a, 28a and to determine whether each cloud 24a, 24b meets the compliance requirements 152 applicable to the specific cloud (or cloud type).

For example, in some embodiments, a cloud environment 40a includes a first public cloud 24a and a first a private cloud 28a. The monitoring system 22 polls each of clouds 24a, 28a and/or the servers 26, 30 in the clouds 24a, 28a to obtain a status information for each cloud 24a, 28a that includes, for example, the current number of available servers 26, 30, location of each server 26, 30, availability of each server 26, 30, and/or any other suitable compliance information. The cloud status from the public cloud 24a is compared to a first set of the cloud-specific requirements 154*a* associated with public clouds (or a subset of public clouds that includes the public cloud 24*a*) and the status information received from the private cloud 28*a* is compared to a second set of cloud-specific requirements 154*b* associated with private clouds (or a subset of private clouds that includes the private cloud 28*a*).

In some embodiments, the first set of cloud-specific requirements 154*a* specifies that each public cloud must provide a minimum of two cloud regions with the capability to support three instances of an application within each region (e.g., three servers each supporting one instance, one server supporting three instances, etc.). If the public cloud 24*a* includes at least two cloud regions each capable of supporting three instances of an application, the public cloud 24*a* satisfies the first set of cloud-specific requirements 154*a*. Similarly, in some embodiments, the second set of cloud-specific requirements 154*b* specifies that each private cloud must provide a minimum of two data centers with two servers within each data center and at least one instance of an application running on each server. If the private cloud 28*a* includes at least two available data centers each with at least two available servers capable of supporting one instance of an application, the private cloud 28*a* satisfies the second set of cloud-specific requirements 154*b*.

In some embodiments, the cloud-specific requirements 154 include one or more cross-cloud requirements, such as, for example, a requirements that a cloud environment 40*a* include at least one private cloud and at least one public cloud that each meet the applicable set of cloud-specific requirements 154*a*, 154*b*. After verifying compliance of each of the individual clouds 24*a*, 28*a*, the monitoring system 22 may review a set of environment-level compliance requirements 156 including cross-cloud requirements. For example, in some embodiments, the environment-level compliance requirements 156 may require that a cloud environment 40*a* include at least one public cloud 24*a* that satisfies the first set of compliance requirements 156*a* and at least one private cloud 28*a* that satisfies the second set of compliance requirements 156*b*. A cloud-level output indicating compliance/non-compliance with each of the cloud-specific compliance requirements 154 is generated. In some embodiments, the method 100 proceeds to optional step 108.

In some embodiments, the cloud-specific requirements 154 include deployment order and/or deployment scale requirements. For example, in some embodiments, the cloud-specific requirements may include deployment norms such as a deployment order requiring a first cloud to receive a certain number of instances and/or be at a predetermined capacity prior to deploying additional instances to a second cloud.

In some embodiments, the cloud-specific requirements 154 and/or the application-specific requirements 252 include one or more of an auto-scale requirement (e.g., requirements that instances be added on traffic spikes or removed on traffic troughs), auto-repair (e.g., requirements that instances be repaired upon reaching unhealthy states), auto-replace, auto-comply, and/or other requirements.

At optional step 108, an extended content verification process is executed to verify the compliance of applications, services, functions, and/or other required cloud functionality (referred to herein as a "cloud asset") to the application-specific requirements 252. The extended content verification process generates an application-level output indicating compliance/non-compliance of each cloud asset with the application-specific requirements 252. An embodiment of an extended content verification process 114*a* is discussed in greater detail with respect to FIGS. 5-6. In some embodiments, optional step 108 is omitted and the method proceeds directly to step 110.

At step 110, the cloud-level response generated at step 106 and/or the application-level response generated at step 108 is reviewed to determine whether the cloud environment 40*a* is configured for deployment of an application. The cloud-level response and/or the application-level response can include a plurality of flags configured to indicate whether a specific compliance requirement is satisfied. The cloud-level response and/or application-level response may include, but are not limited to, an auto repair flag, an auto replace flag, a cloud identifier, a compute identifier, a data center identifier, a disaster recovery flag, an extended content verification flag, an extended content verification instance flag, an environment identifier, an environment compliance flag, a high-availability flag, a disaster-recovery flag, and/or application/service specific flags. Each flag may be set by applying one or more cloud-specific requirements 154 and/or application-specific requirements 252. The flags are reviewed to determine if the cloud environment 40*a* is configured for deployment of an application. For example, deployment of an application may require a high-availability flag and one or more application specific flags to be set to true (e.g., the cloud environment 40*a* complies with these requirements) while other flags may be set to false (e.g., disaster recovery flag if disaster recovery is not required for application deployment). If the cloud environment 40*a* is compliant, the method 100 proceeds to one of step 114-120 as described in greater detail below. Otherwise, the method proceeds to step 112.

At step 112, the cloud environment 40*a* is marked as failing to comply with at least one compliance requirement 152. In some embodiments, the monitoring system 22 is configured to identify which compliance requirement(s) 152 are not met. For example, to continue the above examples, if only a single data center is active within the private cloud 24*a*, the cloud environment 40*a* is marked as non-compliant and the monitoring system 22 identifies the private cloud 24*a*, and more specifically, the lack of a two-data center deployment within the private cloud 24*a*, as the reason for the non-compliance. Similarly, if a required cloud asset is not available (e.g., failed the extended content verification process at step 108), the cloud environment 40*a* is marked non-compliant and the monitoring system 22 identifies the specific cloud-asset as the reason for the non-compliance. If multiple points of non-compliance are identified, the monitoring system 22 may identify each failure point.

At optional step 114, the monitoring system 22 implements one or more processes to correct the non-compliance of the cloud environment 40*a*. For example, if the cloud environment 40*a* fails to meet one or more cloud-specific requirements 154, the monitoring system 22 may implement a process to deploy (or access) additional data centers, cloud regions, servers, clouds, etc. to satisfy the cloud-specific requirements 154. Similarly, if a cloud asset is not available, the monitoring system 22 may implement an application correction process (as discussed in detail with respect to FIGS. 5-6) to correct the application-specific non-compliance. It will be appreciated that the type of action taken by the monitoring system 22 will be dependent on the non-compliance condition identified by the monitoring system 22 at step 112.

At optional step 116, the cloud environment 40*a* is reviewed to generate an optimal and/or suggested application deployment. For example, in some embodiments, the monitoring system 22 identifies optimal data centers, clouds, servers, etc. for deployment of an application. Optimization may be based on providing high responsiveness and throughput, low latency, and/or other optimization or performance metrics. The monitoring system 22 may identify multiple potential deployments based on optimization rules, compliance rules, and/or any other applicable optimization processes. In some embodiments, the optimization rules include existing deployment structure and capacity constraints, specific approved deployment patterns based on group membership (e.g., specific divisions, groups, employees, etc.), and/or any other suitable optimization rules to provide optimal utilization of the cloud environment.

At optional step 118, an application is deployed to the cloud environment 40a. Deployment of an application may be limited such that deployment occurs only when the cloud environment 40a is marked as satisfying all compliance requirements 152 at step 110. The deployment pattern may be based on an optimized deployment pattern determined at step 116 and/or may be a user specified, default, and/or other deployment pattern.

At optional step 120, a snapshot of the compliance status of the cloud environment 40a is generated and stored. For example, in some embodiments, the cloud-level response and/or the application-level response received at steps 104 and 106 is stored in memory of the monitoring system 22 and/or a cloud computer in signal communication with the monitoring system 22. In some embodiments, a plurality of snapshots may be stored at predetermined intervals and/or on a predetermined schedule to provide a historical view and/or trend of the health or availability of an application to provide information regarding production readiness of an application, cloud environment 40a, and/or other historical information. In some embodiments, the snapshots are configured to provide a health check and/or review of deployed applications and services within the cloud environment 40a.

Figure 5:
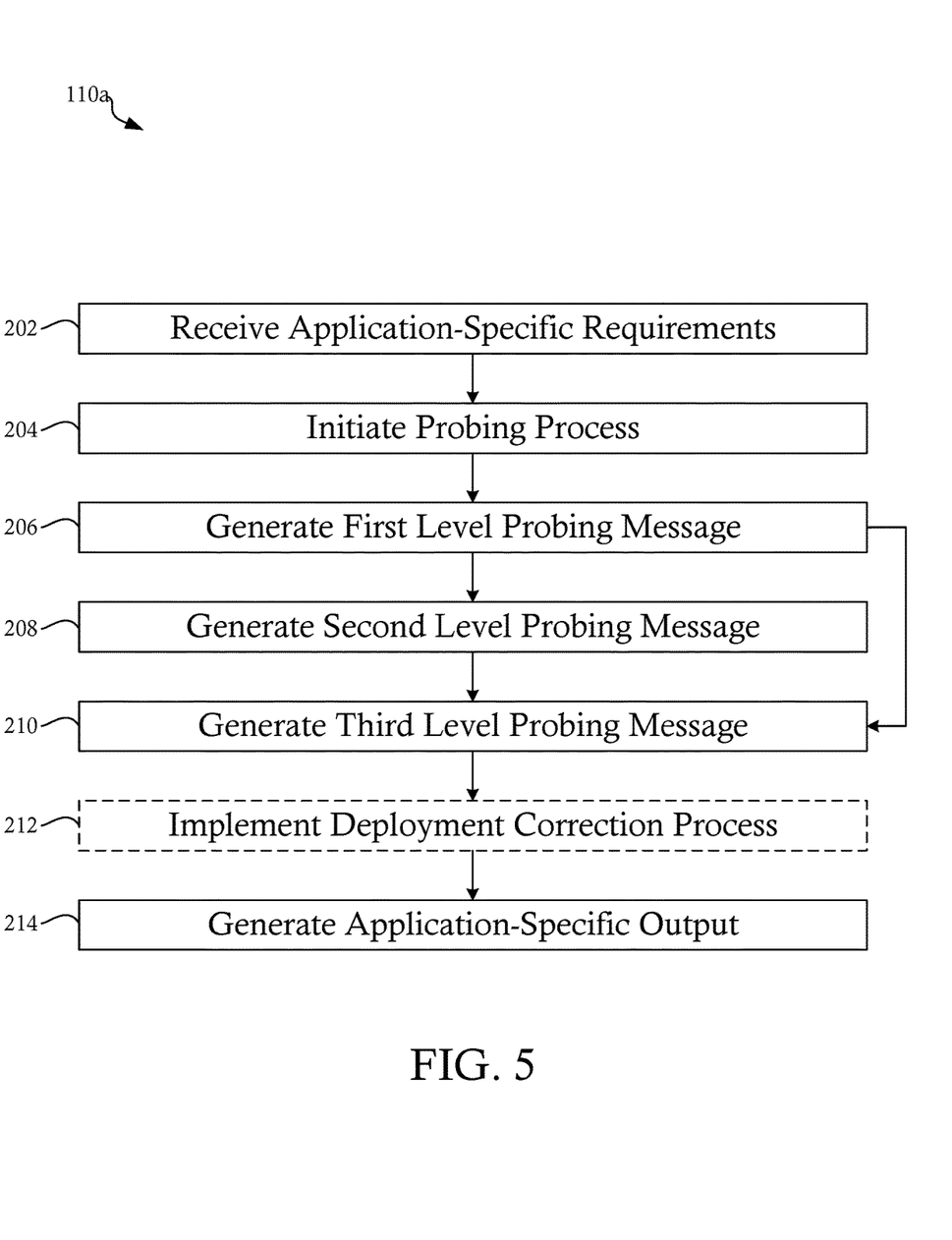
FIG. 5 is a flowchart illustrating a method of extended content verification in a hybrid cloud environment, in accordance with some embodiments.
Figure 6:
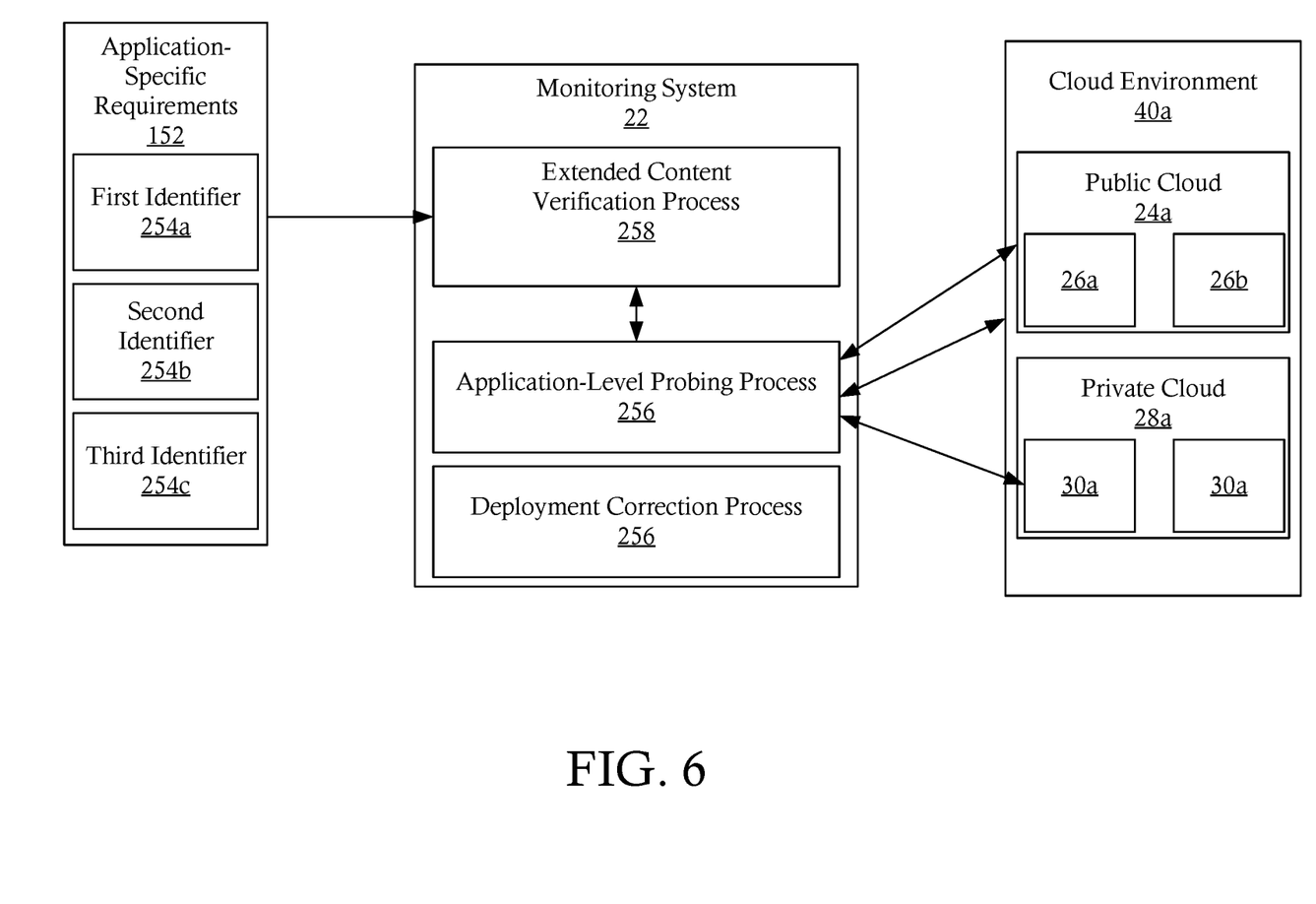
FIG. 6 illustrates various system elements during the execution of the method of extended content verification illustrated in FIG. 5, in accordance with some embodiments.

FIG. 5 is a flowchart illustrating a method 110a of extended content verification, in accordance with some embodiments. FIG. 6 illustrates various system components during execution of the method 110a, in accordance with some embodiments. At step 202, application requirements 252 for a specific application are received. The application requirements 252 can include a plurality of identifiers 254a-254c each associated with an application, service, or other cloud function that is required for deployment of the application. In some embodiments, one or more of the plurality of identifiers 254a-254c are associated with applications/services that are critical for a load balancing deployment of the target application. The application requirements 252 may be received by any suitable system, such as, for example, the monitoring system 22.

At step 204, an application level probing process 256 is initiated for the service associated with each of the plurality of service identifiers 254a-254c. In some embodiments, the probing process 256 is configured to generate one or more probing messages for the service associated with each of the plurality of service identifiers 254a-254c. If a response is received from a service within a predetermined time period, the service is considered active. If a response is not received from the service within the predetermine time period, the service is considered unavailable (e.g., down). The predetermined time period may be any suitable time period, such as, for example, any time period between about 2 seconds to about 10 seconds. In some embodiments, the probing process 256 includes a plurality of sub-steps 206-210 that may be optionally executed to probe each application identified by the plurality of service identifiers 254a-254c.

At step 206, a first level probing message is generated to identify availability of an application within the cloud environment. If the application is currently reachable on any instance within the cloud environment, the probing process 256 will receive a first level response message from the application. The first level probing message identifies the general availability at an application level for a specific application, service, etc. within the cloud environment.

At step 208, a second level probing message is generated and provided to a specific cloud 24a, 28a within the cloud environment 40a. The second level probing message is configured to test whether traffic to the selected cloud 24a, 28a is being appropriately directed, e.g., is arriving at the application/service within the selected cloud 24a, 28a. At step 210, a third level probing message is generated and provided to one or more instance of the application/service within a selected cloud 24a, 28a. The third level probing message is configured to test the selected individual instances to determine whether each instance is reachable/unreachable, healthy/unhealthy, etc.

In some embodiments, an extended content verification process 258 is configured to receive probing responses from the application-level probing process 256 and verify the availability of an application/service. If each level of probing messages receives a predetermined number of valid responses, the application/services are marked responsive and the method 110a proceeds to step 214. For example, in some embodiments, a single response may be required to a first level probing message and a second level probing message for an application/service to be marked responsive but a response to two or more third level probing messages may be required. If the predetermined number of responses is not received to any one of the probing messages, the application/service is marked unresponsive, and the method 110a proceeds to optional step 212.

At optional step 212, a deployment correction process 260 is implemented to correct one or more errors identified by the extended content verification process 258. For example, in some embodiments, if an application/service was marked unresponsive at step 206, the deployment correction process 260 may initiate an application/service deployment process to re-deploy the unresponsive application/service to the cloud environment 40a. Similarly, if an application/service was marked unresponsive at step 208, the correction process 260 may initiate a load-balancing process to redistribute a load within a specific cloud 24a, 28b. As yet another example, if an application/service was marked unresponsive at step 210, the correction process 260 may deploy one or more additional instances of the application/service within the selected cloud 24a, 28a. It will be appreciated that the corrective actions taken at step 212 may be any suitable actions to correct the deficiency identified during the probing process 256. After implementing the correction process 260, the method 110a may return to step 204 to re-execute the probing process 256 to verify availability/health of the application/service.

At step 214, an output indicating whether the application requirements 252 are satisfied is generated. In some embodiments, the output is used in additional steps of the method 100 as discussed in detail above. For example, in some embodiments, the method 100 deploys an application at step 118 only if all application requirements 252 are marked as satisfied by the method 110a. In other embodiments, the output is provided to a user for review, verification, correction, etc. The output may be displayed to a user and/or otherwise communicated to a user.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
   a memory device storing instructions;
   a computing device including at least one processor and communicatively coupled to
   the memory device, wherein the computing device is configured to execute the instructions to:
   receive a set of compliance requirements including one or more application-specific requirements associated with a target application;
   verify the one or more application-specific requirements generating at least one probing message based on at least one identifier of the one or more application-specific requirements;
   determine the one or more application-specific requirements are verified in response to receiving a response message for the at least one probing message within a response time;
   in response to determining the one or more application-specific requirements are unverified, correct the one or more application-specific requirements based on receiving the response message within the response time for the at least one probing message;
   identify a cloud environment as one of compliant or non-compliant based on the one or more application-specific requirements; and
   deploy the target application to the cloud environment, the cloud environment being compliant with the one or more application-specific requirements.

2. The system of claim 1, wherein the one or more application-specific requirements include a high availability requirement, a disaster recovery requirement, and/or both the high-availability requirement and the disaster recovery requirement.

3. The system of claim 1, wherein the one or more application-specific requirements include a first set of application-specific requirements for a first set of a plurality of clouds and a second set of application-specific requirements for a second set of the plurality of clouds.

4. The system of claim 3, wherein the first set of the plurality of clouds comprises one or more public clouds and the second set of the plurality of clouds comprises one or more private clouds.

5. The system of claim 1, wherein the application-specific requirements comprise at least one of a predetermined number of data centers, a predetermined number of servers, a predetermined number of cloud regions, a predetermined number of instances, or any combination thereof.

6. The system of claim 1, wherein the computing device is configured to implement a correction process to correct the one or more application-specific requirements that are not satisfied.

7. The system of claim 1, wherein status information regarding each of a plurality of clouds is received at a predetermined interval.

8. The system of claim 1, wherein the compliance requirements include one or more application-specific requirements.

9. A non-transitory computer readable medium having instructions stored thereon, wherein the instructions, when executed by a processor cause a device to perform operations comprising:
   receiving a set of compliance requirements including one or more application-specific requirements associated with a target application;
   verifying the one or more application-specific requirements generating at least one probing message based on at least one identifier of the one or more application-specific requirements;
   determining the one or more application-specific requirements are verified in response to receiving a response message for the at least one probing message within a response time;
   in response to determining the one or more application-specific requirements are unverified, correcting the one or more application-specific requirements based on receiving the response message within the response time for the at least one probing message;
   identifying a cloud environment as one of compliant or non-compliant based on the one or more application-specific requirements; and
   deploying the target application to the cloud environment, the cloud environment being compliant with the one or more application-specific requirements.

10. The non-transitory computer readable medium of claim 9, wherein the one or more application-specific requirements include a high availability requirement, a disaster recovery requirement, and/or both the high-availability requirement and the disaster recovery requirement.

11. The non-transitory computer readable medium of claim 9, wherein the one or more application-specific requirements include a first set of application-specific requirements for a first set of a plurality of clouds and a second set of application-specific requirements for a second set of the plurality of clouds.

12. The non-transitory computer readable medium of claim 11, wherein the first set of the plurality of clouds comprises one or more public clouds and the second set of the plurality of clouds comprises one or more private clouds.

13. The non-transitory computer readable medium of claim 9, wherein the application-specific requirements comprise at least one of a predetermined number of data centers, a predetermined number of servers, a predetermined number of cloud regions, a predetermined number of instances, or any combination thereof.

14. The non-transitory computer readable medium of claim 9, wherein the instructions, when executed by the processor, cause the device to perform further operations comprising implementing a correction process to correct the one or more application-specific requirements that are not satisfied.

15. The non-transitory computer readable medium of claim 9, wherein status information regarding each of a plurality of clouds is received at a predetermined interval.

16. The non-transitory computer readable medium of claim 9, wherein the compliance requirements include one or more application-specific requirements.

17. A method, comprising:
receiving a set of compliance requirements including one or more application-specific requirements associated with a target application;
verifying the one or more application-specific requirements generating at least one probing message based on at least one identifier of the one or more application-specific requirements;
determining the one or more application-specific requirements are verified in response to receiving a response message for the at least one probing message within a response time;
in response to determining the one or more application-specific requirements are unverified, correcting the one or more application-specific requirements based on receiving the response message within the response time for the at least one probing message;
identifying a cloud environment as one of compliant or non-compliant based on the one or more application-specific requirements; and
deploying the target application to the cloud environment, the cloud environment being compliant with the one or more application-specific requirements.

18. The method of claim 17, wherein the one or more application-specific requirements include a first set of application-specific requirements for a first set of a plurality of clouds and a second set of application-specific requirements for a second set of the plurality of clouds, wherein the first set of the plurality of clouds comprises one or more public clouds and the second set of the plurality of clouds comprises one or more private clouds.

19. The method of claim 17, wherein the application-specific requirements comprise at least one of a predetermined number of data centers, a predetermined number of servers, a predetermined number of cloud regions, a predetermined number of instances, or any combination thereof.

20. The method of claim 17, comprising implementing a correction process to correct the one or more application-specific requirements that are not satisfied.

* * * * *